United States Patent Office 3,522,325
Patented July 28, 1970

3,522,325
ISOPRENE SYNTHESIS
Eugene Aristoff, Newtown Square, Pa., and Richard W. Sauer, Cherry Hill, N.J., assignors to Atlantic Richfield Company, Philadelphia, Pa., a corporation of Pennsylvania
No Drawing. Filed May 23, 1967, Ser. No. 640,472
Int. Cl. C07c 1/30, 17/10
U.S. Cl. 260—680
6 Claims

ABSTRACT OF THE DISCLOSURE

Isoprene is synthesized from a 2-methylbutene-2 feed stock by chlorinating the feed to yield primarily monochloroamylenes which are then subjected to a dehydrohalogenation catalyst on a carrier having an average pore diameter of at least 80 angstroms and a surface area of at least 30 square meters per gram. The isoprene is obtained in high yield and purity with respect to the monochloroamylenes.

BACKGROUND OF THE INVENTION

The prior art is replete with suggested processes for the manufacture of isoprene. Typical of such suggested processes are the following procedures:

(a) Ethynylation of acetone, followed by hydrogenation and dehydration.
(b) Dimerization of propylene, followed by isomerization and pyrolysis.
(c) Condensation of isobutylene and formaldehyde, followed by decomposition of cyclic intermediate.
(d) Isopentane dehydrogenation.
(e) Dehydrogenation of isopentene.

One of the most widely accepted commercial processes for the production of isoprene involves the catalytic dehydrogenation of iso-amylenes with an iron oxide catalyst promoted with sizeable amounts of potassium carbonate and generally a small amount of chromium oxide. This process requires that the dehydrogenation be effected in the presence of a large excess of steam. For efficient operation, the steam to olefin mole ratio is at least 8 to 1 and generally around 12 to 1. Quite high reaction temperatures are required for the process. The range used commercially generally falls between about 585 and 650° C. At these high temperatures and in the presence of the large amounts of steam the activity of the catalyst is maintained by the continuous removal of carbonaceous deposits from the catalyst by the steam-carbon reaction which is catalyzed by potassium carbonate which is thus an essential ingredient in the catalyst.

An important factor in the production of isoprene by dehydrogenation is the selectivity of the dehydrogenation process. Percent selectivity is defined as 100 times the moles of desired product produced divided by the moles of feed stock converted. In order to obtain a reasonable selectivity low pressures (generally between 5 and 25 p.s.i.a.) are required, necessitating large equipment and complicating recovery of the product. At these low pressures and under otherwise near optimum conditions, a selectivity around 80% may be obtained at a total conversion of around 20%. The operations are sometimes conducted under conditions of temperature and space velocity to obtain conversions as high as about 35%, but generally somewhat lower conversion are preferred because the selectivity drops sharply as the conversion is increased. Thus, one of the major shortcomings of this hitherto used process is that the conversion must be limited to quite low values.

SUMMARY OF THE INVENTION

An object of the present invention is to provide a new and improved process for the synthesis of isoprene in high yield and purity from the isoamylene 2-methylbutene-2 over a stable, regenerable catalyst which process is capable of being modified for the additional production of vinyl chloride monomer. The process has one or more of the following advantages:

(1) The process may be operated without steam diluent added to increase conversion and maintain the activity of the catalyst at a high level. Thus, extreme corrosion problems caused by the use of steam in the presence of hydrogen chloride are avoided.

(2) The process may be operated at relatively low temperatures. Operating at lower temperatures results in fewer by-products.

(3) Potassium carbonate is not an essential ingredient in the catalyst and in fact its presence is not recommended. Consequently, difficulties due to hydroscopicity of the catalyst are avoided.

(4) The process may be operated at high conversions (as high as 99%) without sacrifice of the selectivity or catalyst activity.

(5) High purity isoprene monomer is obtained. Thus, the need for extensive product fractionation, ordinarily essential for subsequent polymerization operations, is either minimized or eliminated.

(6) Effective utilization may be made of by-product hydrogen chloride.

In general outline these objects are obtained by the process of this invention in which 2-methylbutene-2 is chlorinated and subsequently dehydrochlorinated over a dehydrohalogenation catalyst, hereinafter defined, at a temperature of 100 to 350° C. and preferably 150 to 250° C. to obtain isoprene. The $C_5$ stream from catalytic cracking contains a preponderance of branched amylenes. We have discovered that separation of 2-methylbutene-2 from this mixture and then using it as a feed significantly improves the conversion per pass and catalyst life. Nevertheless, mixed amylenes can be used with the herein defined catalyst with better conversion and catalyst life than with other catalyst systems. These steps may be integrated into an overall process for the production of isoprene and vinyl chloride by reacting gaseous by-product hydrogen chloride with acetylene.

PREFERRED EMBODIMENTS

The catalyst used in the process of the invention contains a metal from Groups Ib, II and VIII of the Periodic Table or mixtures thereof supported on a large pore diameter carrier. Typically, metals from Groups Ib and II of the Periodic Table of the Elements, as well as the transition metals, will be employed in the form of a metal salt such as the chloride of the metals copper, silver, calcium, barium, zinc, mercury, iron, cobalt, nickel, palladium, platinum, etc. However metal oxides can also be used since these will be converted to the chloride form during dehydrochlorination. Good results can be obtained by employing catalysts containing between about 8 and about 35% by weight of the catalyst of the active metal compound. Higher or lower concentrations may be used when necessary or desirable. However a preferred concentration range of the active metal compound is between about 10 to about 30% by weight of the catalyst mass. Suitable carrier materials are those having an average pore diameter of at least 80 angstroms and preferably 100 to 250 angstroms. In addition, suitable carrier materials should have a minimum of interconnecting small pores and a total surface area of at least 30 square meters per gram. Such carriers include silica, alumina, silica-aluminas and kieselguhr. Colloidal silica, ball clay, etc. may be employed as an inert filler or a binding agent. The catalyst, itself, may be prepared by conventional procedures such as by the impregnation of an appropriate carrier with the active metal compound in known manner.

Prior catalytic dehydrohalogenation processes have typically had a considerable problem with polymerization and coke lay-down. Even when dehydrohalogenation was effected at the minimum operating temperatures, the catalyst deteriorated rapidly and had to be replaced or rejuvenated after a relatively short on-stream period. Accordingly, it was unexpected to find that the dehydrohalogenation catalyst employed in the present invention not only maintained its activity over a long period of time but that process selectivity is actually enhanced in the present invention by operating at high conversion levels.

Reaction vessels for the disclosed process can be constructed of or lined with quartz, glass or metals which do not react with hydrogen chloride under operating conditions.

The invention will be illustrated by the following specific examples, it being understood that there is no intention to be necessarily limited by any details thereof since variations may be made within the scope of the invention.

EXAMPLE I

The starting olefins were 2-methylbutene-1 and 2-methylbutene-2 having a minimum purity of 95 mole percent. Chlorination of the isoamylenes and dehydrochlorination of the resultant products are described below.

Chlorination

Nitrogen pressure on a burette forced the $C_5$ olefins through a brass needle valve and calibrated Fischer-Porter Flowrator into a Y-shaped 1.8 mm. I.D. glass capillary. Dry chlorine entered one arm of the Y-shaped capillary, impinging on the olefin stream at a 45° angle. Below the point of mixing, the capillary was wrapped with asbestos. An adjacent thermocouple indicated that the chlorination was exothermic (max. temperature: 60–80° C., depending on flow rate). The following set of conditions was typical:

Isoamylene rate _____ 10 cc./min.
Chlorine rate _____ 1.8 l./min.
Olefin/$Cl_2$ ratio _____ 1.3 moles/mole.
Contact time _____ 0.009 to 0.003 sec.
Temperature _____ approx. 75° C. (no external heat applied).

The lower end of the capillary extended into a glass T-tube through which passed a steady stream of ice-cooled aqueous sodium hydroxide (approx. 10%). This served to remove the by-product HCl before it could react with the organic phase. The latter was separated from the aqueous layer, dried with anhydrous sodium sulfate, then vacuum distilled. Fractions were analyzed by gas chromatography.

Total composition of chlorination products based on gas chromatographic analysis of the fractions from two different distillations was as follows:

| Component, mole percent | Chlorinated 2-methyl-butene-2 | Chlorinated 2-methyl-butene-1 |
|---|---|---|
| $C_5$ hydrocarbons [1] | 15 | 18 |
| t-Amyl chloride | 1 | 2 |
| Monochloroamylenes | 66 | 68 |
| Dichloropentanes | 17 | 11 |
| Trichloro compounds | 1 | 1 |

[1] Approx. 90% isoamylenes, 10% isoprene.

Although both isoamylenes apparently gave similar products upon chlorination, a more detailed examination disclosed a large difference in isomer distribution. A combination of vapor phase chromatography, infrared and mass spectrometer analysis yielded the following distribution of chloroamylene isomers:

| Component, mole percent | From 2-methyl-butene-2 | From 2-methyl-butene-1 |
|---|---|---|
| (I) 3-chloro-2 methylbutene-1 | 79 | 4 |
| (II) 2-chloromethylbutene-1 | 3 | 56 |
| (III) 2-chloromethyl-trans-butene-2 | 4 | 28 |
| (IV) 2-chloromethyl-cis-butene-2 | 14 | 12 |

We have found that 2-chloromethylbutene-1 (component II, above), the major product from 2-methylbutene-1, dehydrohalogenates to isoprene at a much slower rate than any of the other isomers.

In studying the effect of reaction variables, it was found that as the olefin-chlorine ratio was increased, so did the monochloroamylenes until a maximum yield of about 85% was reached.

TABLE 1

| Olefin/$Cl_2$ (moles/mole) | Product distribution, mole percent | | | Percent olefin conversion |
|---|---|---|---|---|
| | Chloro-amylenes | Dichloro-pentane | t-Amyl chloride | |
| 0.8 | 48 | 52 | Nil | 96 |
| 0.9 | 65 | 35 | Trace | 96 |
| 1.0 | 76 | 24 | do | 95 |
| 1.3 | 83 | 16 | 1 | 89 |
| 1.9 | 83 | 15 | 2 | 67 |

It was additionally discovered that reaction time changed the chloroamylene isomer composition, e.g., longer times yield more trans and cis-2-chloromethyl-butene-2 (III and IV above, respectively) at the expense of 2-methyl-3-chlorobutene-1 (I, above).

TABLE 2

| | Chloroamylene isomer distribution, mole percent (olefin/$Cl_2$: 1.3 moles/mole) | | | |
|---|---|---|---|---|
| Contact time, lbs. seconds | I | II | III | IV |
| 0.020 | 61 | 4 | 8 | 27 |
| 0.009 | 73 | 4 | 5 | 18 |
| 0.003 | 79 | 3 | 4 | 14 |

Dehydrochlorination

The chloroamylene charge system for dehydrochlorination was similar to that used for feeding isoamylenes to the chlorinator except for a 100 mm. long, 0.15 mm. I.D. glass capillary inserted after the burette to restrict flow. Dry nitrogen was used as an inert carrier gas. It was preheated in a 35-foot coil of ¼″ stainless steel tubing contained within an electrically-heated furnace maintained at 300° C. The preheated $N_2$ joined the chloroamylene stream in a heated transfer line; then the total charge entered the top of an electrically-heated glass reactor, 1″ I.D., containing a 7½″ bed (approx. 30 cc.) of 14–20 mesh dehydrohalogenation catalyst. The following set of conditions was typical.

Catalyst: 20% $BaCl_2$ on Grade 70 $SiO_2$ having an average pore diameter of 140 angstrom units and a surface area of 340 m.²/gram (Davison Chemical Div. of W. R. Grace and Co.).
Chloroamylene rate: 0.2 cc./min.
$N_2$ rate: 0.3 l./min.
Temperature: 250° C.
Contact time: 1.0–1.8 sec., preferably about 1.6 sec.

Effluent from the reactor passed into an ice-cooled caustic scrubber (10% NaOH), thence to a Dry-Ice cooled trap. The increase in the weight of the scrubber liquid indicated the amount of HCl absorbed. This was checked by titration. Other products were analyzed by gas chromatography. A tricresyl phosphate column was used to resolve isoprene from 2-methylbutene-1 and 2-methylbutene-2.

When an equimolar mixture of chlorinated 2-methylbutene-1 and chlorinated 2-methylbutene-2 was employed as the charge material for dehydrochlorination under the conditions listed above, conversion to isoprene declined from about 55% to about 30% in approximately 18 hours.

DEHYDROCHLORINATION OF 50-50 MIXTURE OF CHLORINATED 2-METHYLBUTENE-2 AND 2-METHYLBUTENE-1 TO ISOPRENE

| Catalyst | Diluent | Temp., °C. | Contact Time, sec. | Conv., percent | Selectivity, percent | On Stream, Hrs. |
|---|---|---|---|---|---|---|
| 20% BaCl₂ on Grade 70 Silica | Nitrogen | 166 | 1.8 | 52 | 99 | 4 |
| Do | do | 166 | 1.8 | 49 | 99 | 9 |
| Do | do | 167 | 1.8 | 33 | 98 | 18 |

The conversion level was improved by raising the catalyst bed temperature to successively higher temperatures. Above 300° C., however, process selectivity declined. Heating the used catalyst at 540° C. for about 16 hours effected complete catalyst regeneration.

A new charge, obtained by chlorinating 2-methylbutene-2-exclusively, was then contacted with the regenerated catalyst under similar conditions resulting in a 96% conversion. Furthermore, at this high conversion level, catalyst activity remained uniformly high for over 20 hours on stream and the product was water white.

Following the general procedure set forth above for dehydrochlorination of chlorinated 2-methylbutene-2 to isoprene various catalysts were tested. The results of these tests are shown in Table 3.

340 square meters per gram. High conversions, high selectivity and good catalyst life for the Grade 70 silica catalyst can be seen from Table 3.

When other metal salts or oxides of the metals in Groups Ib, II and VIII of the Periodic Table supported on a carrier having an average pore diameter of at least 80 angstroms and a surface area of at least 30 square meters per gram are similarly employed substantially equivalent results are obtained.

EXAMPLE II

Following the procedure of Example I, chlorinated 2-methylbutene-2 is contacted at 250° C. for 1.6 seconds with a cadmium chloride catalyst in the presence of nitrogen diluent. The catalyst contains 15% by weight of the active metal compound based on the weight of the catalyst supported on an alumina carrier having an average pore diameter of 165 angstroms and a surface area of 100 square meters per gram. Conversions and selectivities in excess of 95% are obtained.

TABLE 3

| Catalyst | Diluent | Temp., °C. | Contact Time, sec. | Conv., percent | Selectivity, percent | On Stream, Hrs. |
|---|---|---|---|---|---|---|
| Sand (non-porous silica) | Nitrogen | 250 | 7.9 | 8.5 |  | 1 |
| Do | do | 300 | 10.5 | 13 | 82 | 1 |
| Do | do | 350 | 12.5 | 14 | 69 | 1 |
| Do | Steam | 350 | 1.2 | 47 | 82 | 1 |
| Do | do | 300 | 1.2 | 19 | 87 | 1 |
| Alumina (Alcoa Grade F-10) | do | 250 | 1.2 | 36 | 94 | 1 |
| Do | do | 300 | 1.1 | 50 | 91 | 1 |
| Do | do | 300 | 1.2 | Product very dark in color |  | 1 |
| Silica-Alumina | do | 250 | 1.2 | 47 | 19 | 1 |
| Do | do | 200 | 1.2 | 44 | 50 | 1 |
| Do | do | 150 | 1.4 | 42 | 73 | 1 |
| 10% HgCl₂ on Tabular Alumina | Acetylene | 148 | 1.2 | 3 | 91 | 1 |
| 30% BaCl₂-1% HgCl₂ on activated carbon | do | 168 | 0.7 | 48 | 98 | 4 |
| Do | do | 170 | 0.9 | 32 | 99 | 7 |
| Do | do | 178 | 0.9 | 4 | 100 | 13 |
| 20% BaCl₂ on Grade 70 Silica | do | 158 | 1.2 | 62 | 93 | 4 |
| Do | do | 162 | 1.6 | 53 | 99 | 9 |
| 20% BaCl₂ on Grade 70 Silica | do | 159 | 3.0 | 71 | 100 | 4 |
| 5% HgCl₂, 20% BaCl₂ on Grade 70 Silica | Nitrogen | 250 | 1.6 | 96 | 97 | 5 |
| Do | do | 250 | 1.6 | 94 | 95 | 13 |
| Do | do | 250 | 1.6 | 99 | 99 | 20 |

Referring to Table 3, it will be seen that the use of low surface area, non-porous silica results in both low conversion and relatively poor selectivity at the temperatures required for activity. Although Alcoa Grade F-10 alumina has a very broad pore size distribution, its average pore diameter is about 60 angstroms. The product obtained with this alumina rapidly degraded in color.

The silica-alumina catalyst was a typical cracking catalyst having an average pore diameter in the range of 30 to 40 angstroms. Steam is normally used as a diluent for this catalyst to desorb products and degradation by-products.

Tabular alumina has a very low surface area, less than 30 square meters per gram, and the use of this material as a support resulted in very low conversion.

Activated carbon is a typical carrier used for dehydrohalogenation catalysts. It can be seen from Table 3 that the activity of the catalyst employing this carrier fell off rapidly.

Whereas silica gels normally have a relatively narrow pore size distribution with average pore diameters in the range of 20 to 30 angstroms, Grade 70 silica has an average pore diameter of 140 angstroms and a surface area of

EXAMPLE III

Following the procedure of Example I, chlorinated 2-methylbutene-2 is contacted at 260° C. for 1.4 seconds with a metal oxide catalyst in the presence of nitrogen diluent. The catalyst contains 15% by weight of palladium based on the weight of the catalyst supported on a silica-alumina carrier having an average pore diameter of 80 angstroms and a surface area of 210 square meters per gram. Conversions and selectivities in excess of 90% are obtained.

In Example I, caustic is employed during the chlorination and dehydrochlorination steps to treat by-product hydrogen chloride. Alternately, these steps are integrated into an overall system for the production of isoprene and vinyl chloride. In such a system, by-product hydrogen chloride is reacted with acetylene over a commercially proven catalyst, such as mercuric chloride on active carbon, to obtain monomeric vinyl chloride.

EXAMPLE IV

An equimolar gaseous mixture of preheated isoprene and HCl entered near the bottom of a tower packed with ⅛″ glass beads (I.D.: 14.5 mm.; thermowell O.D.:7 mm.; height of packed section: 11.5"; tower temperature: 35° C.). Pre-cooled n-decane entered near the top of the tower and quenched the hydrocarbon vapors. Approximately 94% of the isoprene charged was found in the quenched liquid product. The following set of conditions was typical:

HCl _____ 0.16 l./min.
Isoprene ____ 0.7 cc./min. (measured as liquid at 26° C.)
n-Decane ___ 2.0 cc./min.

Complete separation of the hydrogen chloride is also possible using such compounds as 2-methylbutene-2 in place of isoprene and chloroamylenes instead of n-decane.

Separated hydrogen chloride is then reacted with acetylene over mercuric chloride on active carbon to obtain monomeric vinyl chloride.

Additional examples of commercial materials which can be employed as support material in the present invention are listed in Table 4.

TABLE 4

| Material | Manufacturer | Avg. pore diam. A | Surface area, m²./gm. |
|---|---|---|---|
| SiO₂ | Davison | 206 | 350 |
| SiO₂ | do | 120 | 350 |
| Al₂O₃ (97%) | Harshaw | 158 | 207 |
| Al₂O₃ (97%) | do | 98–113 | 180–200 |
| Al₂O₃ (96%) | do | 84–113 | 180–200 |
| SiO₂–Al₂O₃ | Davison | 143 | 95 |
| SiO₂–Al₂O₃ | do | 112 | 250 |
| SiO₂ (92% Al₂O₃, 6% SiO₂) | Harshaw | 131 | 277 |
| SiO₂ (60–80%) | Johns-Manville | 2,400 | 38 |

Thus, a novel system is provided by the present invention for making isoprene starting with 2-methylbutene-2 in which by-product hydrogen chloride may be advantageously utilized to produce another commercially important chemical monomer, vinyl chloride. In contrast to the common assumption that operation at high conversion levels leads to inordinate amounts of undesired side products, such as coke, in the present system selectivity is enhanced by operating under such conditions.

Obviously, many modifications and variations of the present invention as hereinbefore set forth may be made without departing from the spirit and scope thereof.

What is claimed is:

1. The process for the production of isoprene which comprises reacting 2-methylbutene-2 with chlorine gas in an olefin-chlorine molar ratio of between about 1.0:1 and 1.9:1 and contacting the chlorinated 2-methylbutene-2 in the presence of a diluent at a temperature between 100 and 350° C. with a dehydrochlorination catalyst comprising a compound of a metal selected from the group consisting of a metal of Groups Ib, II and VIII of the Periodic Table of Elements and mixtures thereof supported on a carrier selected from the group consisting of silica, alumina, silica-alumina, and kieselguhr having an average pore diameter of at least 80 angstroms and a surface area of at least 30 square meters per gram wherein said catalyst contains 8 to 35% by weight of active metal compound based on the weight of the catalyst.

2. The process of claim 1 wherein dehydrochlorination is carried out between 150 and 250° C.

3. The process of claim 1 wherein said dehydrochlorination catalyst contains 10 to 30 percent by weight of active metal compound based on the weight of the catalyst.

4. The process as in claim 1 wherein the chlorinated 2-methylbutene-2 is contacted with a catalyst comprising 10 to 30 percent by weight of barium chloride supported on a silica carrier in a nitrogen diluent at a temperature between 100 and 350° C.

5. The process of claim 1 wherein the conversion is at least about 94 percent and the selectivity is at least about 95 percent in the dehydrochlorination reaction.

6. The process of claim 1 wherein the carrier for the catalyst has an average pore diameter between 100 and 250 angstroms.

References Cited

UNITED STATES PATENTS

| 1,098,858 | 6/1914 | Webel _____ 260—662 |
| 2,389,230 | 11/1945 | Blumer _____ 260—680 X |
| 2,988,521 | 6/1961 | Innes et al. _____ 252—457 |
| 3,052,735 | 9/1962 | Hodgson et al. _____ 260—680 X |
| 3,059,034 | 10/1962 | De Prez _____ 260—662 X |

OTHER REFERENCES

Tischtschenko: Chemisches Zentralblatt, 1936 (II), 2796.

PAUL M. COUGHLAN, JR., Primary Examiner

U.S. Cl. X.R.

252—441; 260—654, 662